(12) United States Patent
Radmanic et al.

(10) Patent No.: US 7,651,159 B2
(45) Date of Patent: Jan. 26, 2010

(54) ROOF STRUCTURE WITH A ROOF CUTOUT AND SEAL THEREFOR

(75) Inventors: Stjepan Radmanic, Mammendorf (DE); Wolfgang Seifert, Wielenbach (DE); Alexander Bergmiller, Königsbrunn (DE)

(73) Assignee: Webasto AG, Stockdorf (DE)

( * ) Notice: Subject to any disclaimer, the term of this patent is extended or adjusted under 35 U.S.C. 154(b) by 0 days.

(21) Appl. No.: 11/995,734

(22) PCT Filed: Jul. 14, 2006

(86) PCT No.: PCT/DE2006/001224

§ 371 (c)(1),
(2), (4) Date: Jun. 23, 2008

(87) PCT Pub. No.: WO2007/009437

PCT Pub. Date: Jan. 25, 2007

(65) Prior Publication Data

US 2009/0115227 A1    May 7, 2009

(30) Foreign Application Priority Data

Jul. 15, 2005    (DE) .................. 10 2005 033 276

(51) Int. Cl.
B60J 10/12    (2006.01)
(52) U.S. Cl. .................. 296/213; 296/216.07; 49/476.1
(58) Field of Classification Search .............. 296/213, 296/216.06–216.09; 49/476.1
See application file for complete search history.

(56) References Cited

U.S. PATENT DOCUMENTS

| 4,749,225 | A | * | 6/1988 | Fuerst et al. | 296/216.03 |
| 4,783,116 | A | * | 11/1988 | Hough | 296/216.07 |
| 4,786,101 | A | * | 11/1988 | Draper | 296/216.05 |
| 5,950,366 | A | * | 9/1999 | Uhlmeyer | 49/484.1 |
| 6,460,920 | B1 | * | 10/2002 | Reinsch | 296/216.08 |

FOREIGN PATENT DOCUMENTS

| DE | 10022020 | | 2/2001 |
| DE | 20111650 | | 9/2001 |
| DE | 19943765 | | 7/2003 |
| DE | 10336192 | | 3/2005 |
| DE | 10336193 | * | 3/2005 |
| JP | 59-213517 | * | 12/1984 |

* cited by examiner

Primary Examiner—Dennis H Pedder
(74) Attorney, Agent, or Firm—Fitch, Even, Tabin & Flannery; John M. Naber

(57) ABSTRACT

The invention relates to a roof structure with a roof cutout for a sliding-lifting roof or an outer sliding-lifting roof. A roof cutout seal is provided, which encircles the roof cutout and which seals a roof skin against a sliding-lifting roof or an outer sliding-lifting roof. A roof stop (7) i.e. a strip (7) serving as a drip strip or drip projection is provided in the area of an edge (6) of the roof skin (2) delimiting the roof cutout (5). Under the strip (7), the roof cutout seal (19) has a sealing channel (26) for holding dripping water. The invention also relates to a roof cutout seal (19) for the roof structure.

8 Claims, 5 Drawing Sheets

ROOF STRUCTURE WITH A ROOF CUTOUT AND SEAL THEREFOR

This application is a 35 U.S.C. §371 National Stage entry of PCT/DE2006/001224, filed Jul. 14, 2006, which claims priority from German Patent Application No.: DE 10 2005 033 276.5, filed Jul. 15, 2005, the contents of which are herein incorporated by reference.

The invention relates to a roof structure with a roof cutout, in particular for sliding-lifting roofs or outer sliding-lifting roofs, and a seal therefor.

It is known in vehicle roofs to arrange sliding-lifting roofs which are either raised and pushed on the outside over the roof skin or are lowered and pushed between roof skin and vehicle roof lining. By this means, roof cutouts which are present and surround the sliding-lifting roof become free, and therefore the vehicle can be ventilated.

In the closed state, the corresponding roof cutout has to be sealed off from the actual displaceable sliding-lifting roof or outer sliding roof such that no moisture or wetness can penetrate the vehicle through the gap between the sliding-lifting roof and the roof skin. For this purpose, roof cutout seals which are customary in general are fastened to the sliding-lifting roof skin, with it being possible, in the case of some of these roof cutout seals with a fastening to the sliding-lifting roof frame, for water to enter the interior of the vehicle from the outside because the roof cutout seal has a deficient sealing effect. In order to prevent the penetration of the water, it is known to apply additional sealing compound. However, the additional application of sealing compound is complicated, causes further installation steps and is therefore expensive.

DE 199 43 765 C2 discloses a sealing system on a motor vehicle with two sealing profile sections on two adjacent vehicle body parts, which sections are movable relative to each other, each of the two sealing profile sections having at least one channel or guiding water, and at least the water-guiding channels of the sealing profile sections partially overlapping in the case of adjacent vehicle body parts.

DE 199 63 276 B4 discloses a sealing strip for a movable roof, in which an organic glass panel is held on a holding frame and the sealing strip is arranged on the circumference, the sealing strip together with the end surface of the circumference of the organic glass panel forming a space which has a passage in order to permit extraneous materials trapped in the space S to be discharged from the space, the sealing strip running annularly along the entire circumference and having at least one opening in at least one corner region of its base.

DE 201 11 650 U1 discloses a vehicle roof with at least two fixed roof parts, there being a sealing profile between the roof parts, the sealing profile having, in the interior, a channel which is connected to the collecting channel and which has at least one opening which guides water located in the collecting channel into the channel during the movement of the first roof part.

It is the object of the invention to provide a roof structure with a roof cutout seal which reliably seals off a roof cutout and conducts away any water penetrating it.

The object is achieved by the features of claim 1.

Furthermore, it is an object to provide a roof cutout seal for the roof structure.

This object is achieved by the features of claim 9.

According no the invention, the roof structure makes provision to arrange a roof cutout seal in an encircling manner in the roof cutout, the encircling roof cutout seal being fastened to the sliding-lifting roof frame without additional sealing compound.

The profile of the encircling roof cutout seal is designed in such a manner that a sealing channel follows a main seal on the roof cutout side, with, above the sealing channel, the roof skin, which delimits the roof cutout in an encircling manner, having, in the region of the roof bent portion, an encircling drip nose or drip strip which is arranged above the sealing channel in such a manner that water which penetrates drips from the drip nose or drip strip into the sealing channel. In the region of removal points in the vehicle body and, in particular, in outflow points in the corner regions of the roof cutout, there are water outflow devices on the roof cutout seal which conduct away water which is guided in the sealing channel into the water outflow system of the sliding-lifting roof frame. In this case, the devices may be a simple perforation or outflow pipes which are stuck on or vulcanized on.

The roof cutout seal may be fastened to guide rails for guiding the mechanism of the sliding-lifting roof and, where the guide rail is not present, to the sliding-lifting roof frame, or may be fastened via a plug-on foot (web).

An advantage of the invention is that the roof structure according to the invention with the encircling roof cutout seal provides reliable sealing in a manner which is simple to fit and is cost-effective.

The invention is explained by way of example with reference to the drawing, in which.

Figure 1:
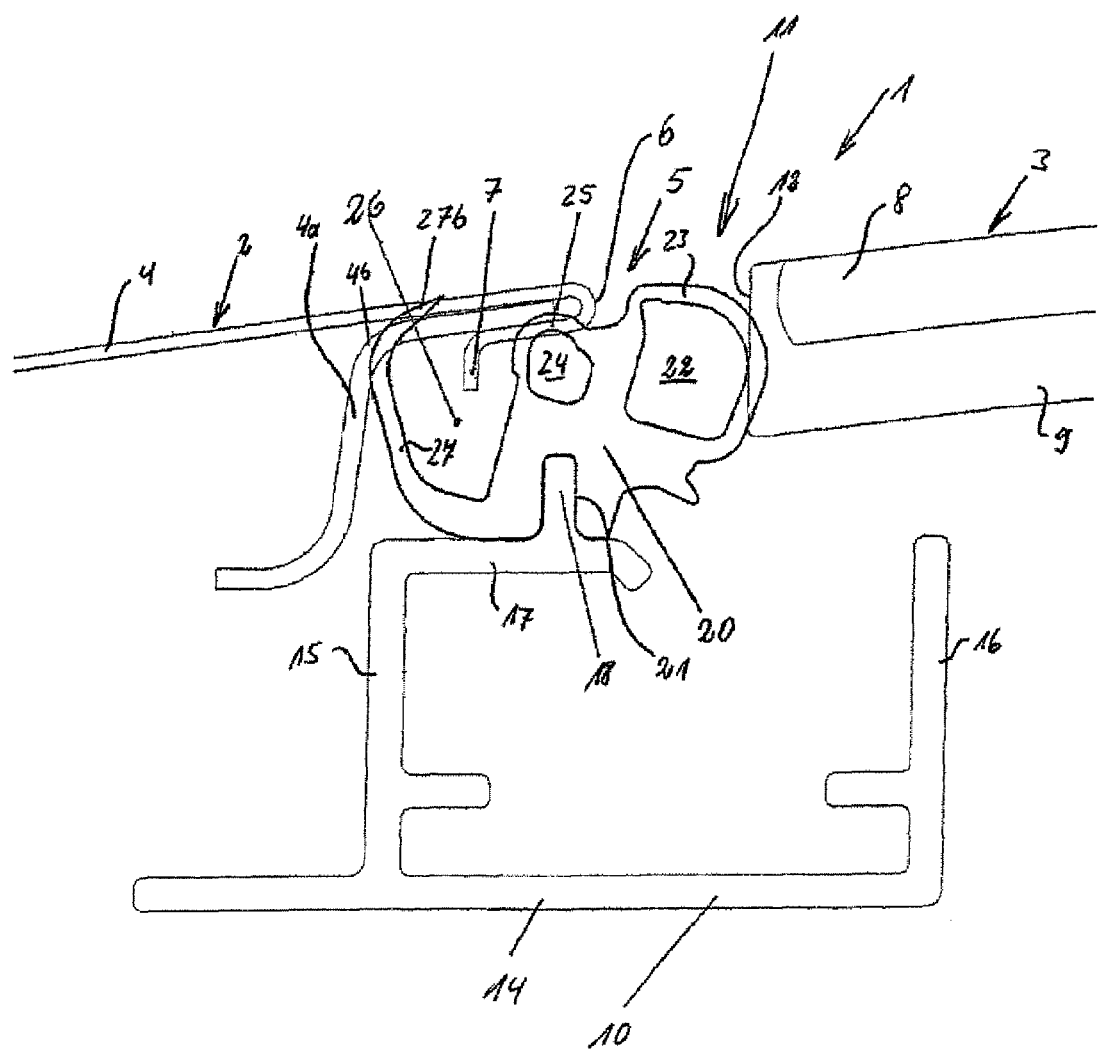
FIG. 1 shows the roof structure according to the invention with the roof cutout seal in a section transversely with respect to the longitudinal axis of the vehicle in the region of a guide rail for guiding the mechanism of a sliding-lifting roof.

The roof structure 1 according to the invention has a roof skin 2 which is customary per se, and a sliding-lifting roof 3.

The roof skin 2 is formed, for example, from a vehicle panel and has an outer roof skin 4 which is bent over through 180° in the region of a roof cutout 5 delimited by the roof skin 2. In order to bring about a stiffening, the outer skin 4 is bent over a longitudinal edge of a reinforcing section 4a which is S-shaped in cross section and, from the edge 6 which delimits the roof cutout 5 and in the region of which the outer skin 4 is bent over, first of all extends along the roof skin 4 and then extends away from the latter.

A free end of the roof skin 4 extends away from the edge 6 and is designed such that it extends with a free longitudinal edge 7 or roof bent portion 7 downward and approximately parallel to the vertical axis of the vehicle. This free longitudinal edge 7 of the vehicle panel which forms the roof skin 2 on the outside runs around the roof cutout 5 and around the edge 6 delimiting the roof cutout 5.

The sliding-lifting roof 3 which has a corresponding sliding-lifting roof plate 8 and a plastic formation 9 which is known per se is arranged in the roof cutout 5. Furthermore, the sliding-lifting roof 3 has actuating and guide mechanisms which are known per se and permit the sliding-lifting roof to be pushed outward out of the roof cutout 5 over the roof skin 2 (outer lifting roof) or from the region of the roof cutout 5 to the inside between a roof skin and a vehicle roof lining. The mechanism is not illustrated in the figures.

Figure 3:
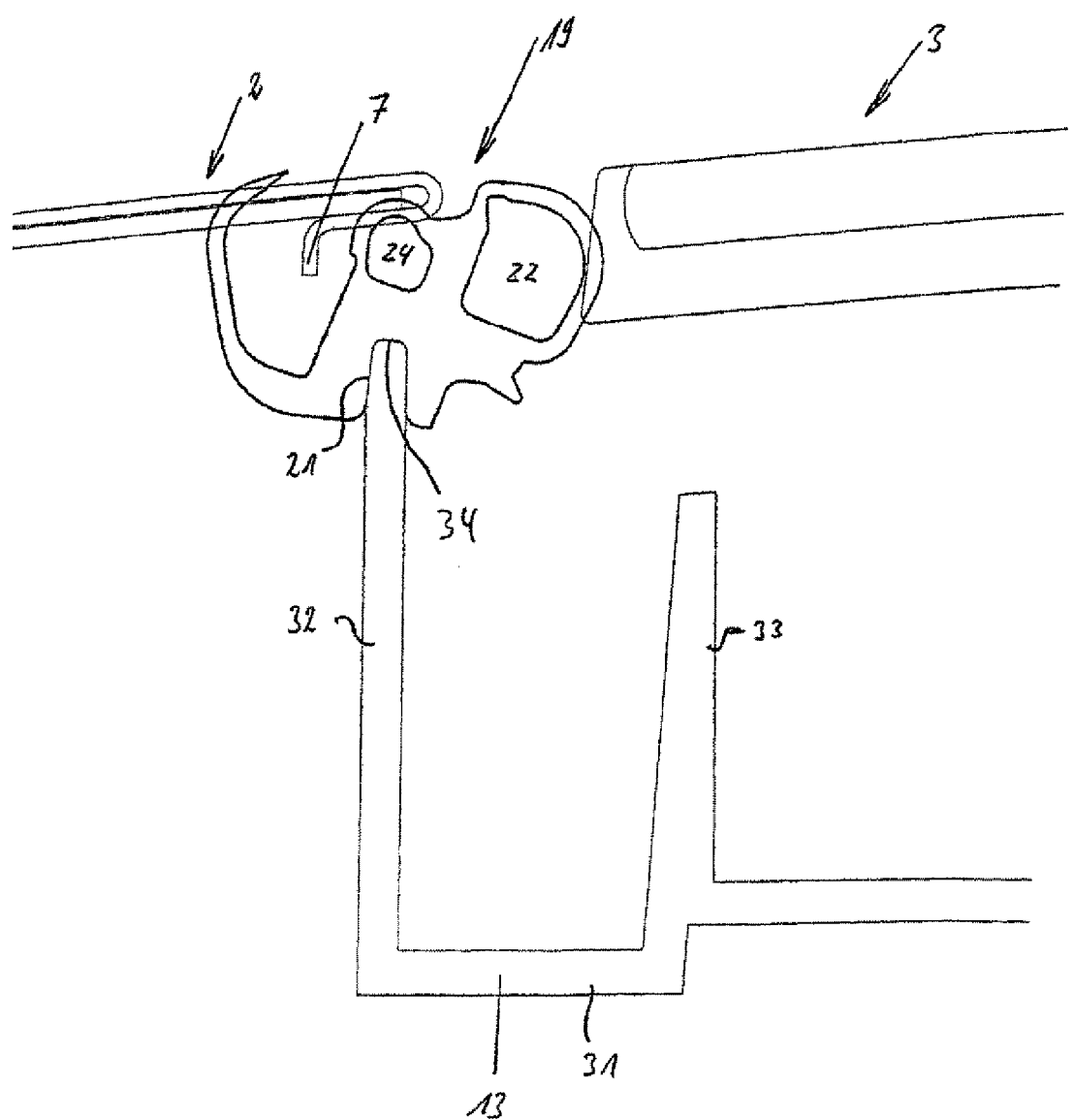
FIG. 3 shows the roof arrangement according to the invention in the region of a sliding-lifting roof frame outside the region of a guide rail.

There is a guide rail 10 to accommodate the mechanism. The guide rail 10 (FIG. 1), or at the points at which there is no guide rail 10, a frame 13 (FIG. 3) of a sliding-lifting roof arrangement 3, is located below the joint region 11 between the edge 6 of the roof skin 2, which edge delimits the roof cutout 5, and an edge 12 of the sliding-lifting roof 3, which edge lies opposite the edge 6.

Figure 2:
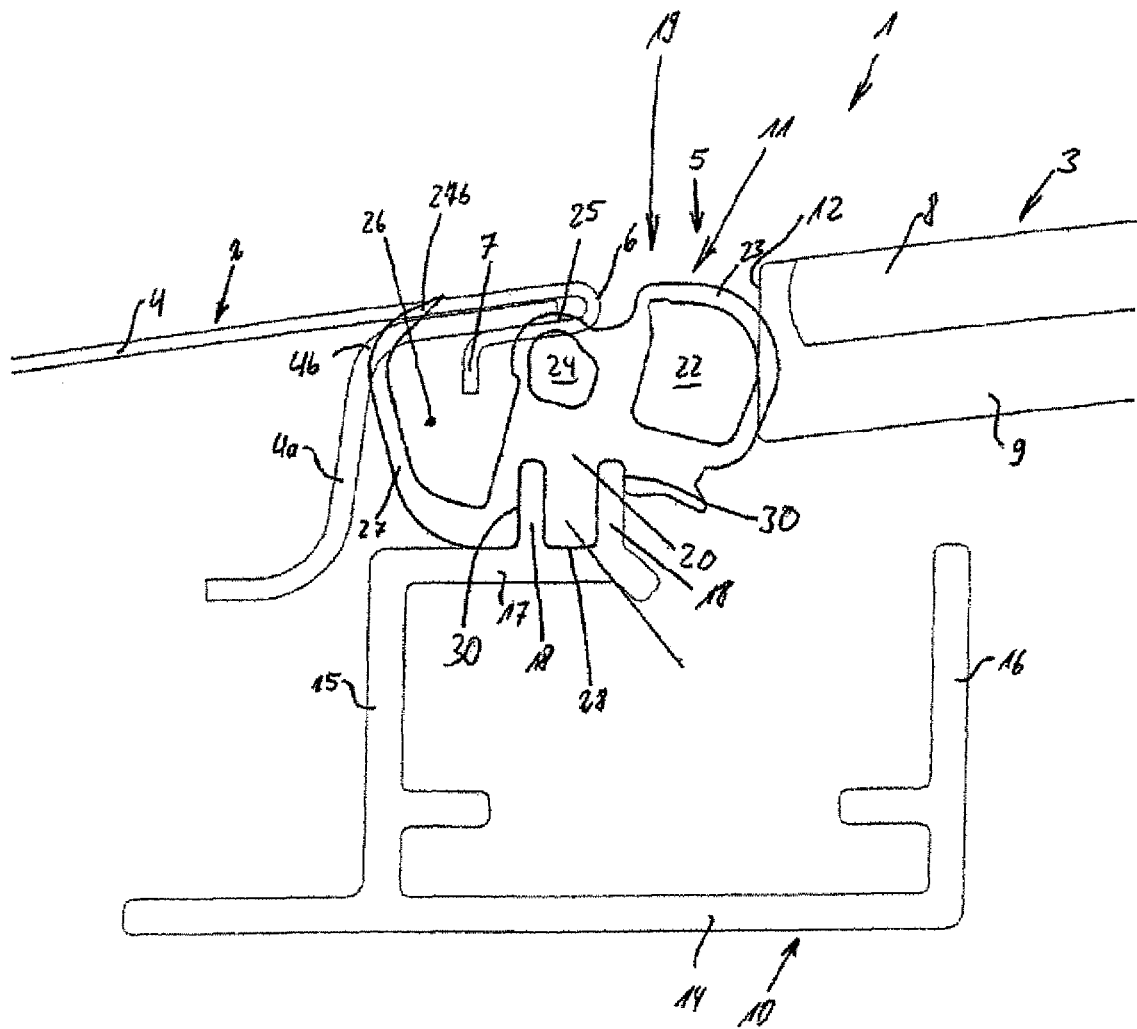
FIG. 2 shows the arrangement according to FIG. 1 with a further embodiment of the connection of the seal to the vehicle.

The guide rail 10 (FIGS. 1, 2) is of approximately U-shape design in cross section with a bottom wall 14 and two side walls 15, 16 which extend from the bottom wall 14 to the roof skin 2 and to the sliding-lifting roof 3, respectively. From the side wall 15, which extends from the bottom wall 14 in the direction of the roof skin 2, a supporting wall 17 extends in a manner running approximately parallel to the bottom wall 14 and such that it lies opposite the latter, the supporting wall extending from the side wall is approximately over half of the width of the guide rail 10 to the side wall 16. The supporting wall 17 has a plug-on strip 18 pointing away from the bottom wall 14 and pointing approximately to the edge 6 of the roof skin 2 or to the bent-over region.

A roof cutout seal 19 is arranged plugged onto the plug-on strip 18.

The roof cutout seal 19 has a sealing body 20 which has, on the lower side, a groove 21 which corresponds to the plug-on strip 18. The roof cutout seal 19 is designed such that it completely encircles the roof cutout 5 without a gap. Toward the joint region 11 between the edge 6 and the edge 12, the roof cutout seal 19 has a first sealing chamber 22 which, in the closed state of the sliding-lifting roof 3, is deformed by the sliding-lifting roof 3 and, by means of an outer wall 23 which delimits the first sealing chamber 22, bears with pressure against the sliding-lifting roof 3. Adjacent to the first sealing chamber 22 and above the plug-on groove 21 there is a second sealing chamber 24 which, in the fitted state, is located below the roof skin 2 in the region of the outer panel 4, which is bent over inwards, and adjacent to the edge 6. The sealing chamber 24 is delimited upward by a wall 25 and toward the free longitudinal edge 7.

A sealing channel 26 is formed on the roof cutout seal 19 adjacent to the basic body 20 of the roof cutout seal 19 and next to the second sealing chamber 24. The sealing channel 26 is delimited by the second sealing chamber 24 or the wall 25 of the second sealing chamber 24 and the basic body 20, which is located below the second sealing chamber 24, of the roof cutout seal 19, the one hand, and a sealing tab 27 which is connected to the basic body 20 and extends away from the basic body 20, or by an encircling sealing channel strip 27. The sealing channel strip 27 here runs in such a manner that the sealing channel 26 is formed so as to encircle the roof cutout 5 below the free longitudinal edge 7. On the upper side of the supporting wall 17, the sealing channel strip 27 first of all extends in a manner diverging away from the basic body 20 of the roof cutout seal 19, with a free end 27b of the sealing channel strip 27 being designed such that it again extends toward the second sealing chamber 24. The free end 27b bears, preferably with slight pressure, against a bending region 46 of the reinforcing panel 4a in order to prevent water from being able to penetrate between the sealing channel strip 27 and the reinforcing panel 4a.

The free longitudinal edge 7, which is arranged in a manner such that it points downward in an encircling manner around the roof cutout 5 somewhat spaced apart from the edge 6 which delimits the roof cutout 5, forms a drip nose or drip strip from which water passing on the lower side between the sealing chamber 24 and the panel 4 drips into the sealing channel 26.

In a further advantageous embodiment (FIG. 2), the structure is basically Identical to the first embodiment, but there are two plug-on strips 18 which run parallel on the supporting wall 17 and form between them a groove 28 into which the seal 19 is plugged by means of a plug-in strip 29, the plug-in strip 29 being delimited by slots 30 which receive the plug-on strip 18 of the supporting wall 17.

In a further advantageous embodiment, the seal 19 is stuck by means of a flat lower side (not shown) of the basic body 20 onto a flat upper side of the supporting wall 17.

Since the guide rails 10 usually extend only in the longitudinal direction of the vehicle and not over the entire width of the roof cutout 5 there, the roof cutout seal 19 extends in the remaining region also over the region in which there is no guide rail 10, over the frame 13 present for the entire sliding-lifting roof arrangement 3. In the simplest embodiment, the frame 13 (FIG. 3) here is, for example, a frame 13 which encircles in an essentially U-shaped manner and is designed with a bottom wall 31 and side walls 32, 33 extending on both sides from the bottom wall 31 to the roof skin 2 and to the sliding-lifting roof 3, respectively. The seal 19 is plugged, for example by means of a plug-on groove 21, onto an upper edge 34 of a side wall 33 which extends in the direction of the roof skin 2. With regard to its profile, the edge 34 of the frame 13 in this case adjoins the plug-on strip 18 of the guide rail 10 such that the installation of the roof cutout seals 19 which encircle in a seamless manner is possible. The remaining parts here are essentially identical to those of the first embodiments.

Figure 4:
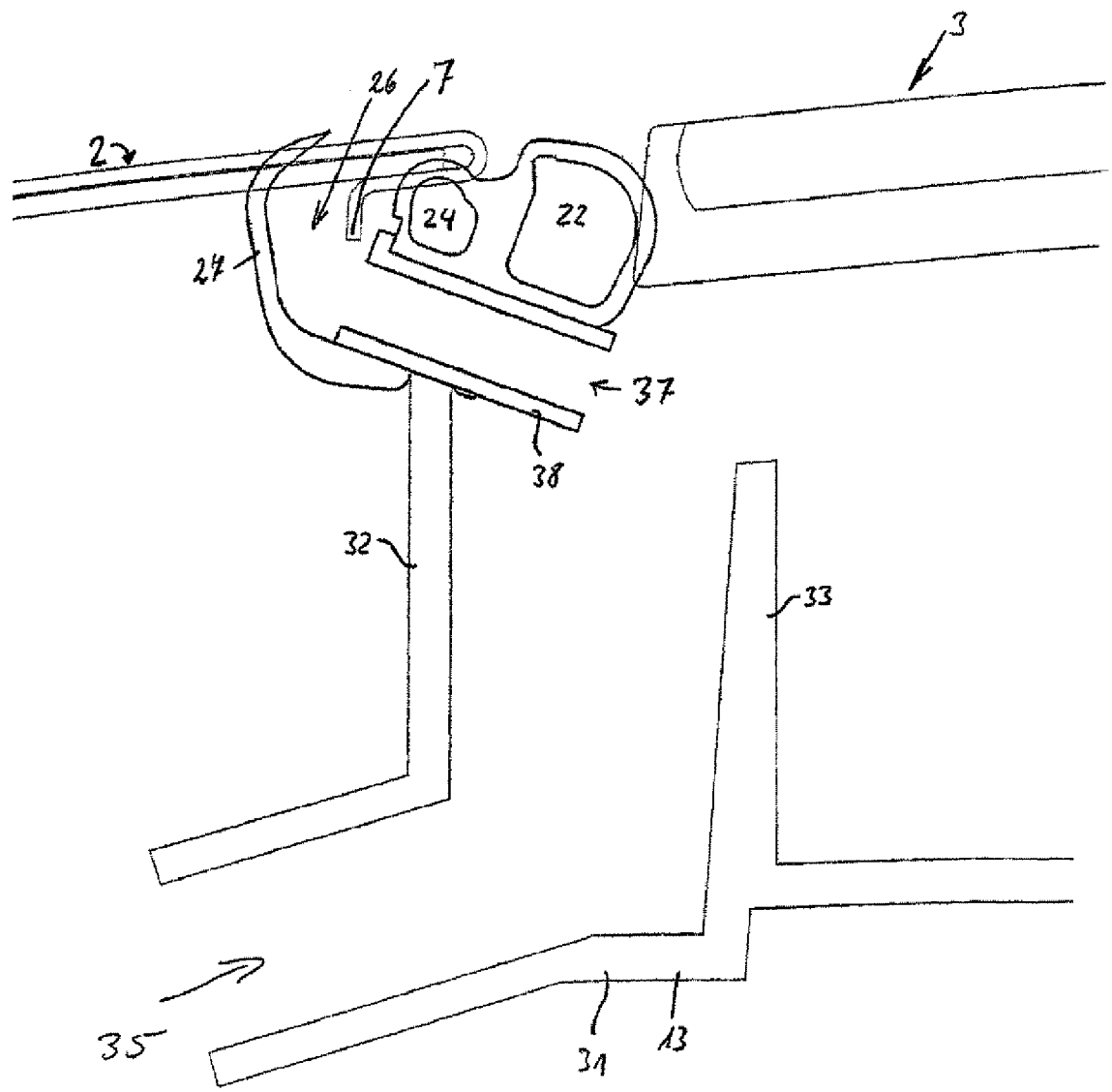
FIG. 4 shows the roof structure according to the invention in the region of an outflow.

In order to be able to remove the water which has collected in the sealing channel 26 and has dripped from the free longitudinal edge 7 or roof bent portion 7, the frame 13 has, in particular in corner regions or in other regions in which the vehicle body is correspondingly designed, a corresponding outflow opening 35 or an outflow channel 35 (FIG. 4). In particular in the region of the outflow channel 35 of the frame 13, the roof cutout seal 19 is likewise designed with an outflow channel 37. The outflow channel 37 is in this case, for example, of hollow-cylindrical design with a wall 38 which delimits the hollow cylinder, the channel 7 extending from the sealing channel 26 below the sealing chambers 22, 24 into a region between the frame walls 32, 33 such that water from the sealing channel 26 is conducted away through the outflow channel 37 into the frame 13 and from there through the outflow 35. The channel 37 is guided here, for example, through a hole in the basic body 20 of the roof cutout seal 19 and is welded, stuck or vulcanized to the material of the roof cutout seal 19 or merely held thereon by pressure.

Figure 5:
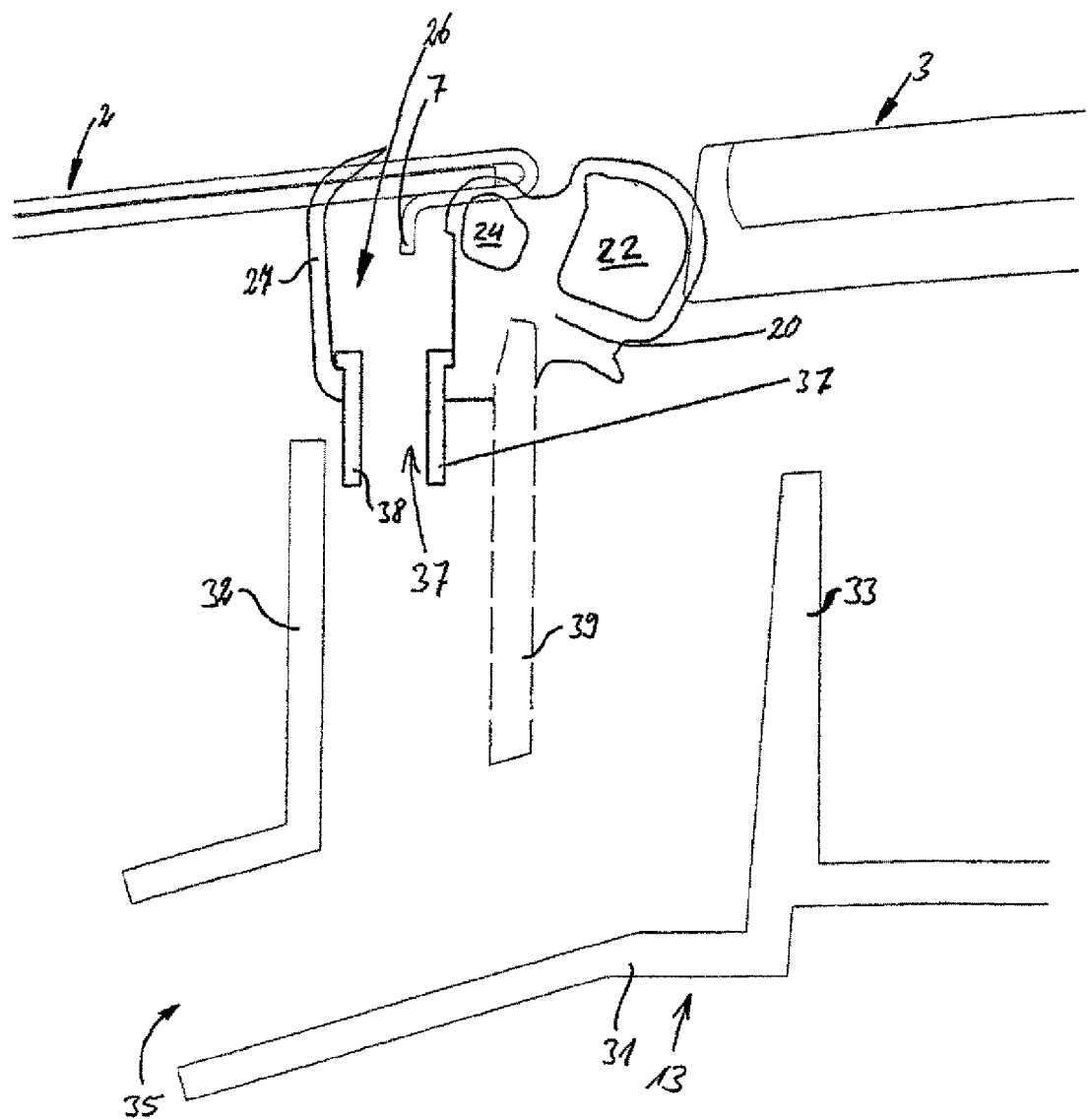
FIG. 5 shows a further embodiment of the roof arrangement with a further embodiment of the outflow.

In a further advantageous embodiment (FIG. 5), the channel 37 does not run through obliquely from the channel 26 below the chambers 22, 24, but rather is guided downward in the region in which the sealing channel strip 27 is used on the basic bodies 20. For this purpose, the frame 13 is of widened design in the region of the outflow 37, so that the channel 37 can project into the U-shaped profile. In order to support the seal, there is a separate supporting wall 17 in this region, the supporting wall taking over the supporting function for the seal in the region of the outflow 35 or 37 of the frame 13 or the seal 19.

In the simplest case, the seal 19 may also have a hole of sufficiently large dimensions (not shown) here in the region in which the sealing channel strip 27 is used on the basic body 20.

The construction of the seal 19 in respect of the main chambers 22, 24 and of the basic body 20 is not essential for the functioning of the channel 26. In the case of the roof structure 1 according to the invention it is essential that, adjacent to or in alignment with the edge 6 which delimits the roof cutout 5, a drip nose 7 or roof bent portion 7 or drip strip 7 is formed which guides water dripping from It into a sealing channel 26 formed on the seal 19. In the case of an outer sliding-lifting roof 3, the seal 19 is arranged in the region of the joint, with the moveable part being raised and pushed away over the roof.

The roof bent portion 7 may also be aligned with the edge 6 and the channel 26 is then correspondingly designed. Furthermore, the roof bent portion 7 may also be designed such that it extends away obliquely from the edge 6.

In the case of sliding-lifting roofs which are displaced between the vehicle roof lining and the roof skin onto the roof cutout, the sliding-lifting roof is displaced with suitable means either below the seal in the longitudinal axis of the vehicle or the seal is offset to the rear along the edge of the roof skin, under which the sliding-lifting roof is raised, to an extent such that the sliding-lifting roof can be moved onto the roof cutout to a point just in front of the seal. In the case of such an arrangement, it is advantageous if there is a further, simply constructed seal in the region of the joint between the sliding-lifting roof and the roof skin for the closed state. It is essential for the functioning that the sealing channel is arranged after the main seal and there is the corresponding roof bent portion or encircling, free longitudinal edge arranged above the channel.

An advantage of the invention is that a roof structure is provided in a simple and effective manner which is easy to fit, the roof structure reliably collecting water which enters through a roof cutout and a seal which is present and conducting it away securely such that it does not enter the vehicle interior.

The invention claimed is:

1. A roof structure with a roof cutout for a sliding roof comprising:
   a roof cutout seal which encircles the roof cutout and seals off a roof skin from a sliding roof,
   the roof cutout having a drip strip to draw any dripping water penetrating the seal in the region of an edge of the roof skin, which edge delimits the roof cutout, and
   below the drip strip the roof cutout seal forms a sealing channel for receiving dripping water, and
   wherein the roof cutout seal has outflows for removing water from the region of the roof cutout.

2. The roof structure of claim 1, characterized in that the roof drip strip is arranged set back at a distance from the encircling edge.

3. The roof structure of claim 1, characterized in that the roof drip strip extends downwardly.

4. The roof structure of claim 1, characterized in that the drip strip is arranged such that it encircles the roof cutout.

5. The roof structure of claim 1, characterized in that the roof cutout seal is plugged onto a guide rail for the mechanism of the sliding roof.

6. The roof structure of claim 1, wherein the outflows are in the frame of the sliding roof.

7. The roof structure of claim 1, wherein the outflows are in the guide rail of the sliding roof.

8. The roof structure of claim 1, wherein the outflows are in the vehicle body.

* * * * *